United States Patent
Thompson, Jr. et al.

(10) Patent No.: US 6,380,289 B1
(45) Date of Patent: Apr. 30, 2002

(54) THERMOPLASTIC COMPOSITION COMPRISING FLUOROALIPHATIC RADICAL-CONTAINING SURFACE-MODIFYING ADDITIVE

(75) Inventors: Delton R. Thompson, Jr., Woodbury; Thomas P. Klun, Lakeland, both of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/421,652

(22) Filed: Oct. 20, 1999

Related U.S. Application Data (63) Continuation-in-part of application No. 08/083,996, filed on Jun. 28, 1993, now abandoned.

(51) Int. Cl.$^7$ .................................................. C08K 5/02
(52) U.S. Cl. ..................... 524/198; 524/462; 524/502; 524/515
(58) Field of Search ................................ 525/104, 105; 524/198, 462, 502, 515

(56) References Cited

U.S. PATENT DOCUMENTS

| | | | |
|---|---|---|---|
| 2,723,999 A | 11/1955 | Cowen et al. | |
| 2,732,398 A | 1/1956 | Brice et al. | |
| 2,803,656 A | 8/1957 | Ahlbrecht et al. | |
| 2,915,554 A | 12/1959 | Ahlbrecht et al. | |
| 3,787,351 A | 1/1974 | Olson | |
| 3,899,563 A | 8/1975 | Oxenrider et al. | |
| 4,086,295 A | 4/1978 | Mori et al. | |
| 4,100,223 A | 7/1978 | Meyer et al. | |
| 4,215,205 A | 7/1980 | Landucci | 525/331 |
| 4,321,336 A | 3/1982 | Meyer et al. | 525/183 |
| 4,426,466 A | 1/1984 | Schwartz | 523/455 |
| 4,444,829 A | 4/1984 | Bollen et al. | 428/220 |
| 4,468,527 A | 8/1984 | Patel | 564/96 |
| 4,518,744 A | 5/1985 | Brody | 525/184 |
| 4,540,497 A | 9/1985 | Chang et al. | 252/8.8 |
| 4,566,981 A | 1/1986 | Howells | 252/8.8 |
| 4,632,861 A | 12/1986 | Vassilatos | 428/296 |
| 4,759,984 A | 7/1988 | Hwo | 428/349 |
| 4,855,360 A | 8/1989 | Duchesne et al. | 525/187 |
| 4,933,229 A | 6/1990 | Insley et al. | 428/224 |
| 5,025,052 A | 6/1991 | Crater et al. | 524/104 |
| 5,043,195 A | 8/1991 | Skrivseth | 428/35.3 |
| 5,145,727 A | 9/1992 | Potts et al. | 428/198 |
| 5,149,576 A | 9/1992 | Potts et al. | 428/198 |
| 5,178,931 A | 1/1993 | Perkins et al. | 428/198 |
| 5,178,932 A | 1/1993 | Perkins et al. | |
| 5,300,357 A | 4/1994 | Gardiner | 428/224 |
| 5,482,765 A | 1/1996 | Bradley et al. | 428/286 |
| 5,804,625 A | 9/1998 | Temperante et al. | 524/188 |

FOREIGN PATENT DOCUMENTS

| | | | |
|---|---|---|---|
| EP | 0 337 662 A2 | 10/1989 | C08L/23/12 |
| WO | WO 91/08254 | 6/1991 | C08K/5/06 |

OTHER PUBLICATIONS

Banks, Ed., Organofluorine Chemicals and Their Industrial Applications, Elis Horwood Ltd., Chichester, England, pp. 215–234 (1979).

Wente, Van A., "Superfine Thermoplastic Fibers," Industrial Engineering Chemistry, vol. 48, pp. 1342–1346 (1956).

Report No. 4364 of the Naval Research Laboratories, published May 25, 1954, entitled "Manufacture of Superfine Organic Fibers" by Wente, Boone, and Fluharty.

Rudkin et al., "Fluorocarbon Elastomer Aids Polyolefin Extrusion," Plastics Engineering, pp. 83–86 (1986).

Mares et al., "Modification of Fiber Surfaces by Monomeric Additives, Part II: Absorption of Fluorocarbon Additives by Polyethylene Terephthalate," Textile Research Journal, vol. 48, No. 4, pp. 218–229 (1977).

Sanders, M.R., "Use of Polybutene to Improve Impact Properties of Polypropylene Film," ANTEC '90, pp. 1167–1171.

*Primary Examiner*—Jeffrey Mullis
(74) *Attorney, Agent, or Firm*—Robert H. Brink; Lucy C. Weiss (57) ABSTRACT

A thermoplastic composition comprises (a) a major amount of a semi-crystalline thermoplastic first polymer; (b) an amount of a fluoroaliphatic radical-containing surface-modifying additive sufficient to modify surface properties of articles made of the composition; and (c) a minor amount of a second thermoplastic polymer sufficient to enhance the effects of the surface-modifying additive.

22 Claims, 1 Drawing Sheet

THERMOPLASTIC COMPOSITION COMPRISING FLUOROALIPHATIC RADICAL-CONTAINING SURFACE-MODIFYING ADDITIVE

This is a continuation-in-part of Application No. 08/083,996 filed on Jun. 28, 1993 now abandoned.

FIELD OF THE INVENTION

This invention relates to a composition comprising thermoplastic polymer, such as polypropylene, and fluoroaliphatic radical-containing surface-modifying additive which modifies a surface property of the composition, such as water repellency. In another aspect it relates to shaped articles, such as fibers, comprising said composition, and methods of making said articles.

BACKGROUND OF THE INVENTION

Thermoplastic polymers are widely used to make a variety of shaped articles including, for example, fibers, blown films, cast films, extruded sheets, and foams. Fibers, films, or other shaped articles are often prepared by melt extrusion. In many cases it is desirable for the shaped article to have low surface-energy, oil- and water repellency, or anti-soiling properties. In other cases it is desirable for the surfaces of the shaped article to be hydrophilic. Various fluorochemical compositions have been used to impart desired surface-properties to polymers and to the surfaces of shaped articles made therefrom.

Fluorochemical compositions have also been used as processing aids in the extrusion of synthetic resins into fibers and films as described in Rudkin et al., "Fluorocarbon Elastomer Aids Polyolefin Extrusion," Plastics Engineering, March 1986, pp 83–861 and in U.S. Pat. No. 4,855,360 (Duchesne et al.)

Topical addition of fluorochemical additives has been used to impart desired surface-properties, for example, water repellency or hydrophilicity. See, for example, Banks, Ed., *Organofluorine Chemicals and Their Industrial Applications*, Elis Horwood Ltd., Chichester, England, 1979, pp 215–234.

Fluorochemical additives have also been incorporated into compositions by melt extrusion of a blend of synthetic fiber-forming polymer and fluorochemical additive. For the purpose of the specification, such additives will be referred to as "melt additives". Such melt extrusion is described, for example, in F. Mares et al., "Modification Extrusion Techniques," *Textile Research Journal*, Vol. 48, No. 4, pp. 218–229, International Application No. PCT/US90/05928 (Sterling et al.), and U.S. Pat. No. 3,899,563 (Oxenrider et al.). Compositions may be incorporated into polymer melts by injection of the composition into the molten polymer stream immediately on exiting the extruder barrel according to the procedure described in U.S. Pat. No. 4,933,229 (Insley et al.).

U.S. Pat. No. 5,025,052 (Crater et al.) describes certain fluoroaliphatic-containing oxazolidinones useful as melt additives in thermoplastic polymers. Fibers, films, and other shaped articles can be prepared by melt extrusion or injection molding of a composition comprising a thermoplastic polymer and said oxazolidinone. The oxazolidinone imparts low surface energy to the surfaces of the resulting fibers, films, and other shaped articles.

U.S. Pat. No. 5,043,195 (Skrivseth) discloses flexible sheet material comprising an antistatic layer. Said antistatic layer comprises a polymer having dispersed therein a fluoroaliphatic sulfonamido polyether.

The properties of thermoplastic polymers have also been modified by blending with other polymers. For example, U.S. Pat. No. 4,759,984 (Hwo) discloses compositions comprising polybutylene, polypropylene, and modified ethylene vinyl acetate (EVA). Said blends are said to produce a peelable heat seal between substrates on which it is carried. European Patent Application No. 337,662 (Ferrar) discloses a polymer blend comprising polypropylene and PB 0200 polybutylene, wherein the polybutylene is said to enhance the tenacity of the oriented polymer. See also, M. Sanders, "Use of Polybutene to Improve Impact Properties of Polypropylene Film," NTEC 190, P. 1167.

SUMMARY OF THE INVENTION

Briefly, in one aspect, this invention provides thermoplastic compositions comprising a major amount of a first thermoplastic semi-crystalline polymer, such as polyolefin (e.g., polypropylene), a fluoroaliphatic radical-containing surface-modifying additive (e.g., an oxazolidinone), and a minor amount of a second thermoplastic polymer (e.g., polybutylene) which decreases the percent crystallinity of the first thermoplastic polymer and which increases, or enhances, the effect of the surface-modifying additive. The surface-modifying additive is present in an amount sufficient to impart desired properties to the surfaces of shaped articles of the composition. Said second polymer is present in an amount sufficient to increase the effect of said surface-modifying additive, i.e., an equal surface-modification may be obtained with less additive, or a greater surface modification may be obtained with an equivalent amount of additive. Said first polymer and said second polymer can each be a single polymer or a mixture of polymers.

In another aspect, this invention provides shaped articles comprising the composition of this invention. Said surface-modifying additive is dispersed within the shaped article and is present at the surfaces of the shaped article.

In a further aspect, this invention provides methods of preparation of shaped articles with modified surface properties.

As used herein, "major" and "minor" amounts means that there is more of the major amount than of the minor amount. As used herein, "polymer" means a polymer or a mixture of polymers. For example, said first polymer can be polypropylene or a mixture of several polypropylenes. The compositions of this invention, which comprise a three-component blend of first polymer, second polymer and surface-modifying additive, have enhanced surface-modification, for example, increased water repellency or hydrophllicity, compared to two-component blends of thermoplastic polymer and surface-modifying additive, or two-component blends of first and second polymer.

BRIEF DESCRIPTION OF THE DRAWING

These and other features, aspects, and advantages of the present invention will become better understood with regard to the following description, appended claims, and accompanying drawings, wherein:

DETAILED DESCRIPTION OF THE INVENTION

Useful first polymers are semi-crystalline, that is, they contain both crystalline and amorphous regions. Preferred thermoplastic polymers useful as the first polymer in the present invention are fiber-forming and film-forming polyamides, polyesters, polyolefins (such as polypropylene and polyethylene), or blends thereof.

The fluoroaliphatic radical-containing surface-modifying additive preferably can be melt-processed with a thermoplastic polymer composition in an effective amount to impart a desirable surface property, such as oil-repellency, water repellency, or hydrophilicity, to the surface of shaped articles thereof Additionally, enough compatibility of the surface-modifying additive with the first polymer at its melt-processing temperature is preferred to assure adequate distribution of the additive within the bulk of the melt during processing. Some incompatibility at temperatures below the processing temperature may be beneficial to facilitate migration of the additive to the surface of the resulting shaped article. After the melt blend is cooled, the additive is present at the surface of the shaped article in an amount sufficient to alter a surface property.

Surface-modifying additives useful in the present invention are those that can impart desired surface properties, for example, water repellency, oil-repellency, anti-static properties, or hydrophilicity, to polymers and the surfaces of shaped articles.

Useful additives for imparting water repellency are described, for example, in Banks, supra. Such additives include, for example, fluorochemical guanidines (U.S. Pat. No. 4,450,497, Chang), compositions of cationic and non-cationic fluorochemicals (U.S. Pat. No. 4,566,981, Howells), compositions containing fluorochemical carboxylic acid and epoxidic cationic resin (U.S. Pat. No. 4,426,466, Schwartz), fluoroaliphatic carbodiimides (U.S. Pat. No. 4,215,205, Landucci), fluoroaliphatic alcohols (U.S. Pat. No. 4,468,527, Patel), and fluorochemical oxazolidinones (U.S. Pat. No. 5,025,052, Crater).

Surface-modifying additives suitable for providing hydrophilicity are described, for example, in Banks, supra. Compounds comprising a fluoroaliphatic group and a non-ionic water solubilizing group such as poly(oxyethylene), poly (oxypropylene), or poly(oxyethylene-co-oxypropylene) are particularly useful for imparting hydrophilicity. Useful fluoroaliphatic group-containing non-ionic compounds can be prepared using known methods such as those described in U.S. Pat. No. 2,915,554 (Albrecht et al.). The Albrecht patent discloses the preparation of fluoroaliphatic group-containing non-ionic compounds from active hydrogen containing fluorochemical intermediates, such as fluoroaliphatic alcohols (e.g., $R_fC_2H_4OH$), acids (e.g., $R_fSO_2N(R')$ $CH_2CO_2H$) and sulfonamides (e.g., $R_fSO_2N(R')H$), by reaction of the intermediates with, for example, ethylene oxide to yield, respectively, $R_fC_2H_4O(C_2H_4O)_nH$, $R_fSO_2N(R')$ $CH_2CO_2(C_2H_4O)_nH$, and $R_fSO_2N(R')(C_2H_4O)_nH$, where n is a number greater than about 3, and R' is hydrogen or lower alkyl (e.g., 1 to 6 carbons). Analogous compounds can be prepared by treating the intermediates with propylene oxide or a mixture of ethylene oxide and propylene oxide. See also the fluoroaliphatic oligomers disclosed in U.S. Pat. No. 3,787,151 (Olson), and certain fluorinated alcohol-ethylene oxide condensates described in U.S. Pat. No. 2,723,999 (Cowan et al.), which descriptions are hereby incorporated by reference.

Polymers useful as the second polymer of this invention are those polymers (or blends of polymers) which reduce the crystallinity of the first polymer. Generally, a second polymer will not decrease the crystallinity of the first polymer if it is incompatible with the first polymer.

When the first polymer is a polypropylene homopolymer, copolymer, or mixtures thereof the second polymers useful in this invention include resins such as polybutylene and copolymers thereof such as, for example, polybutylene PB 0200, polybutylene PB 0400, polybutylene PB 0800, polybutylene DP 8310, and polybutylene DP 8340 (all available from Montell, Houston, Tex.); and atactic poly(alpha) olefins, such as APAO-2180 E8 atactic polypropylene (high MW homopolymer of polypropylene, available from Rexene Co.).

The second polymer, such as polybutylene PB 0200, generally is effective at levels of about 5 wt. %, with a preferred level of at least about 10 wt. %. The enhancement effect is seen at additive levels of up to 25 wt. % and higher.

As the concentration of surface-modifying additive, such as fluorochemical oxazolidinone, is increased, the surface-property modification increases. Surprisingly, as the concentration of the second polymer is increased without changing the concentration of the surface-modifying additive, the surface-property modification increases, % fluorine at the surface of the shaped article increases, and the total percent crystallinity of the composition decreases.

Benefits from this invention may be realized at the surface of a shaped article, such as film, fiber, and fabric (and multilayer articles and also filter media, for example in the form of respirators, comprising such fabric), resulting from melt processing of the compositions of this invention.

The following non-limiting examples are presented to further describe and illustrate the invention. In the examples, weight percentages are based upon the total weight of all components, unless otherwise indicated.

EXAMPLES

For Examples 1–36 and Comparative Examples C1–C21 presented later, various compositions were prepared and blown microfiber webs were prepared from the compositions using conventional methods described, for example, in Wente, Van A., "Superfine Thermoplastic Fibers," *Industrial Engineering Chemistry*, Vol. 48, pages 1342 et seq. (1956), and in Report No. 4364 of the Naval Research Laboratories, published May 25, 1954, entitled "Manufacture of Superfine Organic Fibers" by Wente, Boone, and Fluharty. More details concerning the web extrusion procedure are given in Example 1.

For the remaining Examples and Comparative Examples, the Melt-Blown Extrusion Procedure described below was employed.

Melt-Blown Extrusion Procedure

The melt-blown extrusion procedure that was used for the latter group of Examples and Comparative Examples is described in U.S. Pat. No. 5,300,357, column 10, which description is incorporated herein by reference. The extruder used was a Brabender 42 mm conical twin screw extruder, with maximum extrusion temperature of 270–280° C. and distance to the collector of 12 inches (30 cm).

Fluorochemical and thermoplastic polymer mixtures were prepared by blending thermoplastic polymer(s) and fluorochemical polymer melt additive (if used) in a paperboard container using a mixer head affixed to a hand drill for about one minute until a visually homogeneous mixture was obtained.

The process conditions for each mixture were the same, including the melt blowing die construction used to blow the microfiber web, the basis weight of the web ($55\pm5$ g/m$^2$) and the diameter of the microfibers (5–18 micrometers). Unless otherwise stated, the extrusion temperature (i.e., die temperature) was 270–280° C., the primary air temperature was 270° C., the pressure was 124 kPa (18 psi), with a 0.076 cm air gap width, and the polymer throughput rate was about 180 g/hr/cm.

Webs made using either of the two above-cited extrusion procedures were evaluated using one or more of the following test procedures.

Water Repellency Test

The water repellency ("WR") of webs was measured using a water and isopropyl alcohol test and was expressed in terms of a water repellency rating of the web. Ratings were determined by placing mixtures of water and isopropyl alcohol onto the samples to be tested. The water repellency rating corresponds to the most penetrating mixture which did not penetrate or wet the fabric after 10 seconds contact, with the rating being one-tenth of the volume % of isopropyl alcohol in that mixture. For example, a 70% by volume isopropyl alcohol mixture corresponds to a rating of 7. Webs which were not penetrated by (i.e., were resistant to) only a 100 percent water (i.e., 0 percent isopropyl alcohol) mixture (the least penetrating of the test mixtures) were given a rating of 0 (representing the amount of isopropyl alcohol present). Webs that were not penetrated by (i.e., were resistant to) a 0 percent water (i.e., 100 percent isopropyl alcohol) mixture (the most penetrating of the test mixtures) were given a rating of 10. Higher numbers indicate higher water repellency.

Oil Repellency Test

The oil-repellency ("OR") of webs was measured by AATCC Standard Test 118-1978, which is based on the resistance of webs to penetration by oils of varying surface tensions. Webs resistant only to Nujol™, the least penetrating of the test oils, were given a rating of 1, whereas treated fabrics resistant to heptane (the most penetrating of the test oils) were given a value of 8. Other intermediate values were determined by use of other pure oils or mixtures of oils. The rated oil repellency corresponds to the most penetrating oil (or mixture of oils) which did not penetrate or wet the web after 30 seconds contact. Higher numbers indicate better oil repellency.

Water Absorbency Test

Initial hydrophilicity, or wetting, was determined by using a water drop test. Several drops of deionized water were placed upon the web to be tested. If the drops were absorbed within 5 seconds, the web was said to be wetting. If the drops were still present on the substrate after 5 seconds in a spherical or hemispherical form, the substrate was said to be non-wetting. This test is a modification of the water repellency test described in U.S. Pat. No. 4,540,497 (Chang et al.).

Static Decay Test

The values for static decay were determined by using a Model 406C Static Decay Meter available from Electro-Tec Systems, Inc., 115 E. Glenside Ave., Glenside, Pa. 19038. This test is described in ASTM-D-4496-85, "DC Resistance or Conductance of Moderately Conductive Materials". This test is intended to determine the electrostatic properties of materials in film or sheet form, by measuring the time required to induce a charge on the surface of the material, measuring the intensity and polarity of the charge, and measuring the time required for substantial dissipation of the induced charge.

The working voltage used was 5000 volts. The time recorded was that required to drain off 90% of the initially applied working voltage. The values were measured and reported for both positive and negative applied voltages. A value reported as −2.0/+1.8 means the decay time for a negatively applied voltage was 2.0 sec., and the decay time for a positively applied voltage was 1.8 sec. Some samples cannot be measured because they either fail to accept a charge or fail to release a charge.

Hydrophilicity Test

The Hydrophilicity Test was run by holding a rectangular nonwoven web sample approximately 6×2 inches (15.2×5.1 cm) under a stream of either hot (approximately 45° C.) or cold (approximately 25° C.) tap water with a volume output of approximately 200 mL/min at a distance of about 1 inch (2.5 cm) from the water spigot. The following scale was used to rate hydrophilicity:

1—immediate wetting (most desirable situation);
2—wetting delayed for about 0.5 to 2.0 seconds;
3—wetting delayed from greater than 2.0 seconds to about 10 seconds;
4—wetting delayed from greater than 2.0 seconds to about 10 seconds, but occurs only where the nonwoven sample contacts the hand placed under the sample;
5—no wetting (least desirable situation).

Where the degree of wetting varied across the web, a set of several number values was recorded, representing values measured in a direction perpendicular to the machine direction from one side of the web to the other. For example, in one case, the first 40% of the distance across the web showed a reading of "1", the next 20% of the distance across the web showed a reading of "5", and the final 40% of the distance across the web showed a reading of "2". The reported rating for this web was the weighted average of the three values across the web, i.e., (0.40)(1)+(0.20)(5)+(0.40)(2)=2.2.

A value of no greater than 3 for both hot and cold water is desired.

Polar Liquid Wetting Time Test

In the Polar Liquid Wetting Time Test, a drop of a test polar liquid was placed onto a nonwoven web at ambient lab conditions, and the time in seconds for the polar liquid to fully penetrate the web (i.e., none of the drop was visible) was recorded. A rating of "0" indicated that the polar liquid immediately wet the web (i e., zero seconds). A rating of "NW" indicated that the polar liquid did not wet the web. The following test polar liquids were used:

DI H$_2$O—deionized water
10% NaOH—10% (wt.) aqueous sodium hydroxide
20% NaOH—20% (wt.) aqueous sodium hydroxide
30% NaOH—30% (wt.) aqueous sodium hydroxide
neat EG—neat ethylene glycol
conc. H$_2$SO$_4$—concentrated sulfuric acid (98% by weight)

Fluorine Content

The fluorine content on the surface of the fibers was determined by Electron Spectroscopy for Chemical Analysis (ESCA), which measures the % fluorine at the surface of shaped articles. The fluorine elemental analysis was conducted with a Surface Science SSX-100 ESCA spectrometer, using a focused monochromatic X-ray excitation source to determine the fluorine at the surface.

Polypropylene Morphology

The percent crystallinity in the polypropylene phase was obtained using wide angle X-ray diffraction on a Philips APD-360 automatic diffractometer and copper radiation within the 2 to 50 degree (2θ) scattering angle region. The intensity data was analyzed by means of profile fitting whereby six crystalline polypropylene peaks, two crystalline polybutylene peaks, and an assumed amorphous peak centered at approximately 17 degrees (2θ) were used to determine the area under the observed scattering pattern (within the 7 to 32 degree (2θ) region). The area calculated for the crystalline polypropylene fraction and amorphous fraction were used to produce a total scattered intensity value for the data set. Percent crystallinity was detennnined by dividing the total crystalline polypropylene area by the total scattered intensity.

In the following Examples 1–14 and Comparative Examples C1–C11, compositions comprising a water- and oil repellent surface-modifying additive were prepared.

Example 1

The surface-modifying additive used in this Example was a fluorochemical oxazolidinone ("FC") prepared from the reaction of $$C_8F_{17}SO_2N(CH_3)CH_2\overset{\overset{\displaystyle O}{\displaystyle \diagup\!\!\!\diagdown}}{CH}CH_2,$$

octadecyl amine and dimethyl carbonate as described in U.S. Pat. No. 5,025,052 (Crater et al.)

A dry blend was prepared by mixing, in a 5-gallon pail on a drum mixer, 898 g of PP 3505G polypropylene (400 melt-flow resin available from Exxon), 2 g (0.2% by weight) of the above surface-modifying additive, and 100 g (10% by weight) of PB 0200 polybutylene (available from Montell, Houston, Tex.).

Webs were prepared using a 1.9 cm (¾ inch) diameter Brabender extruder with a 25.4 cm wide melt-blowing die having smooth-surfaced circular orifices (0.043 cm diameter) with a 5:1 length to diameter ratio. The above blend was extruded by setting the first extruder zone temperature to 283° C., and all of the other zones, including the die, were set to 288° C. The primary air temperature was maintained at approximately 288° C. An air pressure of 16 psi (110.3 kPa) was maintained with an air gap width of 0.076 cm (0.030 inches) and a setback of about 0.069 cm (0.027 inches). With a collector distance of 30 cm (12 inches), the take up speed was set to obtain a basis weight of 50 g/sq meter. The blend was extruded at a throughput rate of about 57.7 gm/hr per cm of die width. The average diameter of the resulting fiber was about 2–20 micrometers. The resulting web was calendared on a 5% bond area embossing roll at about 104° C. at 30 cm per minute (12 fpm) and at about 36.5 kg per cm (200 pounds/lineal inch).

The embossed sample was then tested for oil-repellency, water repellency and % fluorine using the above described test methods.

Examples 2–6

In Examples 2–6, webs were prepared and tested as in Example 1 except that the amount of the fluorochemical oxazolidinone was varied.

Comparative Example C1–C8

In Comparative Examples C1–C7, webs were prepared and tested as in Example 1 except with varying amounts of fluorochemical oxazolidinone, including zero, and witout PB 0200 polybutylene. In Comparative Example C8, webs were prepared and tested as in Example 1 (with 10% PB 0200 polybutylene), except without any surface-modifying additive.

The results from these evaluations are presented in TABLE 1.

TABLE 1

| Ex. # | Wt. % of FC | Wt. % of PB 0200 | OR | WR | % F |
|---|---|---|---|---|---|
| 1 | 0.2 | 10 | 1.0 | 5.0 | 19.46 |
| 2 | 0.4 | 10 | 1.0 | 6.3 | 27.97 |
| 3 | 0.6 | 10 | 6.0 | 10.0 | 40.10 |
| 4 | 0.8 | 10 | 7.3 | 10.0 | 43.86 |
| 5 | 1.0 | 10 | 8.0 | 10.0 | 43.29 |
| 6 | 2.0 | 10 | 8.0 | 10.0 | N/R* |
| C1 | 0.0 | 0 | 0.0 | 2.0 | — |
| C2 | 0.2 | 0 | 0.0 | 3.0 | 13.81 |
| C3 | 0.4 | 0 | 1.0 | 5.0 | 25.97 |
| C4 | 0.6 | 0 | 1.7 | 8.0 | 33.43 |
| C5 | 0.8 | 0 | 3.0 | 10.0 | 40.80 |
| C6 | 1.0 | 0 | 3.0 | 10.0 | 40.75 |
| C7 | 2.0 | 0 | 6.0 | 10.0 | N/R* |
| C8 | 0.0 | 10 | 0.0 | 2.0 | — |

*Not Recorded

Figure 1:
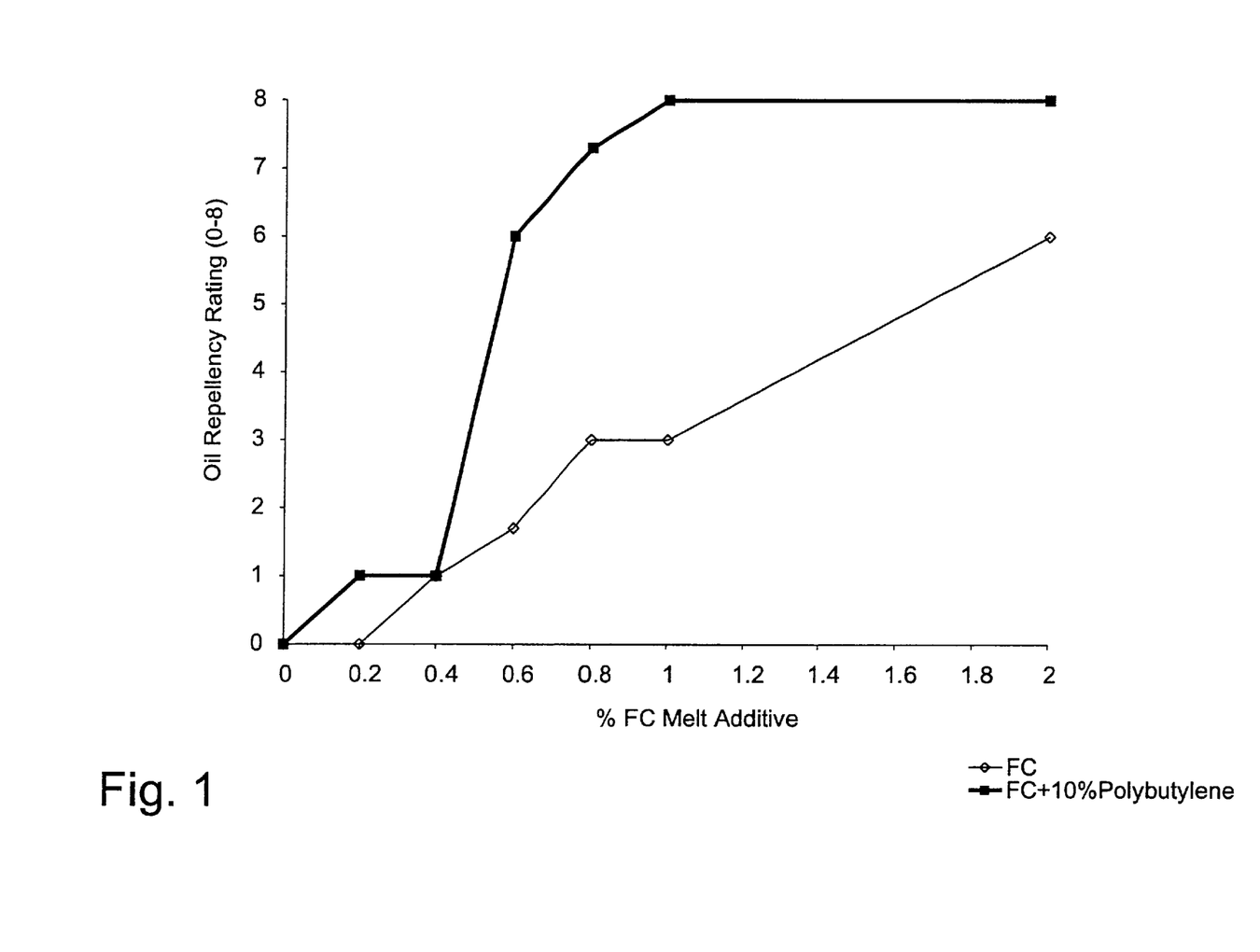
FIG. 1 shows plots of oil repellency rating versus percent of fluoroaliphatic radical-containing surface-modifying additive (fluorochemical oxazolidinone) for (a) polypropylene-based compositions of the invention containing 10 weight percent polybutylene; and (b) comparative polypropylene-based compositions containing no polybutylene. These plots are graphical representations of the oil repellency data set forth in Table 1, infra, for these compositions.

The data in TABLE 1 show that a given oil- or water repellency rating could be obtained with a lower level of surface-modifying additive when polybutylene was used, and that at equal surface-modifying additive levels, higher repellency was possible when polybutylene was included. In particular, the oil resistance was dramatically improved, as shown in FIG. 1. At equal surface-modifying additive levels, there was also noticeably more fluorine at the fiber surface in the Examples incorporating polybutylene than in the Comparative Examples without polybutylene.

For example, comparing Example 3 to Comparative Example C4, each with 0.6 wt. % fluorochemical oxazolidinone, the oil-repellency was 1.7 without polybutylene and 6.0 with polybutylene. The water repellency was 8.0 without polybutylene and 10 with polybutylene. Example 3 also had more fluorine present at the surface of the shaped article.

Examples 7–15

In Examples 7–15, webs were prepared and tested as in Example 1 except the amount of surface-modifying additive and the amount of PB 0200 polybutylene ("PB") were varied. The percent crystallinity ("% XSTAL") in the polypropylene phase of the fibers was determined using the above described test method.

Comparative Examples C9–C12

Comparative Examples C9–C12 were prepared and tested as in Examples 7–15 except without polybutylene.

The results from these evaluations are presented in TABLE 2.

TABLE 2

| Ex. # | Wt. % PB | Wt. % FC | OR | WR | ESCA % F | XSTAL % |
|---|---|---|---|---|---|---|
| 7 | 10 | 0.28 | 1.0 | 8.0 | 25.80 | 44.27 |
| 8 | 10 | 0.7 | 6.8 | 9.9 | 38.14 | 44.29 |
| 9 | 10 | 0.7 | 7.0 | 10.0 | 37.0 | 43.88 |
| 10 | 10 | 0.7 | 7.0 | 10.0 | 35.67 | 49.21 |
| 11 | 10 | 0.7 | 6.0 | 9.7 | 34.29 | 47.24 |
| 12 | 10 | 1.12 | 7.0 | 10.0 | 39.87 | 44.79 |
| 13 | 20 | 0.4 | 5.0 | 9.0 | 35.98 | 40.08 |
| 14 | 20 | 1.0 | 8.0 | 10.0 | 44.90 | 41.52 |
| 15 | 24.14 | 0.7 | 8.0 | 10.0 | 41.83 | 38.24 |
| C9 | 0 | 0.4 | 1.0 | 7.3 | 33.17 | 50.63 |
| C10 | 0 | 0.7 | 2.0 | 9.0 | 31.91 | 49.87 |
| C11 | 0 | 0.7 | 2.0 | 9.0 | 33.55 | 53.01 |
| C12 | 0 | 1.0 | 6.0 | 10.0 | 41.25 | 52.36 |

The data in TABLE 2 show that, in general, an increased surface-property modification was obtained with the compositions of this invention, resulting in improved oil- and water repellency.

The above results demonstrate the enhanced oil- and water repellency performance of fluoroaliphatic radical-containing surface-modifying addition.

The second polymer, such as polybutylene, can also enhance the performance of fluoraliphatic radical-containing hydrophilic surface-modifying additive. In the following Examples 16–20 and Comparative Examples C13–C19, compositions comprising a hydrophilic surface-modifying additive were prepared.

Example 16

A fluoroaliphatic group-containing nonionic compound (i.e., hydrophilic surface-g additive) of structure $C_8F_{17}SO_2N(C_2H_5)(CH_2CH_2O)_7CH_3$, was prepared as described in U.S. Pat. No. 2,915,554 (Albrecht et al.), and dry blended with PP3505G polypropylene as in Example 1 to give a mixture with 0.2 wt. % of the surface-modifying agent, 10 wt. % PB 0200 polybutylene and 89.8 wt. % polypropylene.

Webs were then prepared as in Example 1. The webs were tested for static decay using the Static Decay Test.

Examples 17–20

In Examples 17–20, webs were prepared and tested as in Example 16 except with varying amounts of the surface-modifying additive ("SMA") of Example 16.

Comparative Examples C13–C17

In Comparative Examples C13–C17, webs were prepared and tested as in Example 16 except with varying amounts of the surface-modifying additive and without polybutylene.

Comparative Example C18

In Comparative Example C18, webs were prepared and tested as in Example 16 except with 0.5 wt. % of HTS905 antistat (available from BASF, Gurnee, Ill.), a fluorine-free hydrophililic surface-modifying agent, and with 20 wt. % of DP8340 poly(butylene-co-ethylene) (available from Montell, Houston, Tex.) as the second polymer. The webs were calendared at 93° C. and 25 psi.

Comparative Example C19

In Comparative Example C19, webs were prepared and tested as in Comparative Example C18 except without second polymer.

The results from these evaluations are presented in TABLE 3.

TABLE 3

| Ex. # | Type of SMA | Wt. % SMA | Wt. % 2nd Polymer | Static Decay (sec.) |
|---|---|---|---|---|
| 16 | fluoroaliphatic | 0.2 | 20 | No release |
| 17 | fluoroaliphatic | 0.4 | 20 | −5.1/+5.5 |
| 18 | fluoroaliphatic | 0.6 | 20 | −1.1/+1.2 |
| 19 | fluoroaliphatic | 0.8 | 20 | −0.7/+1.0 |
| 20 | fluoroaliphatic | 1.0 | 20 | −0.4/+0.6 |
| C13 | fluoroaliphatic | 0.2 | 0 | No release |
| C14 | fluoroaliphatic | 0.4 | 0 | >60 |
| C15 | fluoroaliphatic | 0.6 | 0 | −2.2/+3.6 |
| C16 | fluoroaliphatic | 0.8 | 0 | −1.6/+1.1 |
| C17 | fluoroaliphatic | 1.0 | 0 | −0.4/+0.6 |
| C18 | fluorine-free | 0.5 | 20 | * |
| C19 | fluorine-free | 0.5 | 0 | 0.012 |

*would not accept charge

The data in TABLE 3 show that, when polybutylene was included in the composition, an equal static-decay effect could be obtained with lower levels of surface-modifying additive, and that at equal surface-modifying additive levels, a higher static decay effect (shorter time) was possible. A 0.6% addition of the hydrophilic surface-modifying additive was needed to impart wetting in a web made from melt blown fibers without any polybutylene. With a 10% addition of polybutylene PB 0200, the same degree of wetting was achieved at 0.4% loading of the hydrophilic surface-modifying additive. Additionally, the static decay time performance was increased (i.e., the decay times were shorter) as compared to analogous samples without polybutylene. In Comparative Examples C18 and C19, where a fluorine-free surface-modifying additive was used, the second polymer actually decreased the effect of the surface-modifying additive.

In Examples 21–36, and Comparative Examples C20 and C21, various polymers were evaluated as alternatives to polybutylene as the second polymer.

Examples 21–28 and Comparative Example C20

In Examples 21–28 and Comparative Example C20, webs were prepared and tested as in Example 3 using 0.6% FC, except that the second polymers listed below were substituted for the polybutylene. The second polymer ("MP") used and the results of testing are shown in Table 4. The results from Comparative Examples C4 (with 0.6% FC) are shown again for comparison.

Examples 29–36 and Comparative Example C21

In Examples 29–36 and Comparative Example C21, webs were prepared and tested as in Example 5 using 1.0% FC except that the second polymers listed below were substituted for the polybutylene. The second polymer ("MP") used and the results of testing are shown in TABLE 4. The results from Comparative Example C6 (with 1% FC) are shown again for comparison.

The second polymers used were: Polybutylene DP 8310, a 1-butylene and ethylene copolymer of 3.0 Melt Index from Montell, Houston, Tex. (a low ethylene containing copolymer); Polybutylene DP 8340, a 1-butylene and ethylene copolymer of 4.0 Melt Index from Montell, Houston, Tex. (a high ethylene containing copolymer); Dow Aspun 6806, a linear low-density copolymer of ethylene and octene-1 of 105 Melt Index from Dow Chemical Company; TPX 007, a 26 Melt Index 4-methyl-1-pentene copolymer from Mitsui Company of Japan; TPX DX820, a 180 Melt Index 4-methyl-1-pentene copolymer from Mitsui Company of Japan; APAO-2180 E8, an atactic polypropylene homopolymer from Rexene Company; Polybutylene PB 0200, a 1-butylene homopolymer of 1.8 Nominal Melt Index from Montell, Houston, Tex.; Polybutylene PB 0400, a 1-butylene homopolymer of 20 Nominal Melt Index from Montell, Houston, Tex.; Polybutylene DP 0800, a 1-butylene homopolymer of 200 Nominal Melt Index from Montell, Houston, Tex.

TABLE 4

| Ex. # | % FC | MP | OR | WR |
| --- | --- | --- | --- | --- |
| 21 | 0.6 | DP 8310 | 5.5 | 10 |
| 22 | 0.6 | DP 8340 | 6.0 | 10 |
| 23 | 0.6 | 6806 | 1.0 | 8.8 |
| 24 | 0.6 | TPX DX820 | 3.0 | 9.0 |
| 25 | 0.6 | APAO-2180 | 3.8 | 9.0 |
| 26 | 0.6 | PB 0200 | 2.8 | 9.0 |
| 27 | 0.6 | PB 0400 | 2.7 | 9.0 |
| 28 | 0.6 | PB 0800 | 2.3 | 8.5 |
| C20 | 0.6 | TPX 007 | 1.0 | 8.0 |
| C4 | 0.6 | None | 1.7 | 8.0 |
| 29 | 1.0 | DP 8310 | 5.9 | 10 |
| 30 | 1.0 | DP 8340 | 7.3 | 10 |
| 31 | 1.0 | 6806 | 5.0 | 10 |
| 32 | 1.0 | TPX DX820 | 4.0 | 9.3 |
| 33 | 1.0 | APAO-2180 | 6.0 | 10 |
| 34 | 1.0 | PB 0200 | 6.8 | 10 |
| 35 | 1.0 | PB 0400 | 7.0 | 10 |
| 36 | 1.0 | PB 0800 | 7.3 | 10 |
| C21 | 1.0 | TPX 007 | 2.0 | 9.0 |
| C6 | 1.0 | None | 3.0 | 10 |

The OR and WR data in TABLE 4 show that enhanced surface-property modification, as compared to Comparative Examples without second polymer, was achieved with a variety of second polymers. The positive results from APAO-2180 E8 atactic propylene reinforce the idea that a reduction in crystallinity may be important, because the addition of atactic polypropylene will tend to interfere with the crystal formation in the polypropylene PP 3505G first polymer which is an isotactic polypropylene. The negative results from TPX 007 are likely due to incompatibility of the high-melting TPX 007 with PP 3505G polypropylene.

Minor enhancing of oil-repellency was obtained by utilizing 4-methyl-1-pentene copolymer (TPX DX820 available from Mitsui) in place of the polybutylenes or polypropylenes listed above.

Examples 37–48 and Comparative Examples C22–C24

In Examples 37–48, nonwoven webs containing varying amounts of fluorochemical oxazolidinone B (0.5–2.0 wt. %) and PB 0400 polybutylene ("PB"; 5–35 wt. %) in PP 3505G polypropylene were prepared as described in the Melt-Blown Extrusion Procedure and were evaluated for oil and water repellency. Fluorochemical oxazolidinone B is a polymer melt additive prepared by reacting $C_8F_{17}SO_2N(CH_3)$ $CH(OH)CH_2Cl$ with stearyl isocyanate at a 1:1 molar ratio followed by ring closure, using essentially the same procedure as described in Scheme I of U.S. Pat. No. 5,025,052 (Crater et al.). PB 0400 is a 1-butylene homopolymer of 20 nominal melt index, available from Montell, Houston, Tex.

In Comparative Examples C22–C24, the same series of experiments was run as in Examples 37–48, except that the PB 0400 was omitted.

The results of the testing are shown in TABLE 5.

TABLE 5

| Ex. # | Wt. % FC | Wt. % PB | OR | WR |
| --- | --- | --- | --- | --- |
| C22 | 0.5 | 0 | 0.5 | 4.5 |
| 37 | 0.5 | 5 | 1 | 7.5 |
| 38 | 0.5 | 15 | 2 | 8 |
| 39 | 0.5 | 25 | 1.5 | 8 |
| 40 | 0.5 | 35 | 1.5 | 8 |
| C23 | 1.25 | 0 | 3.5 | 9.5 |
| 41 | 1.25 | 5 | 4 | 9.5 |
| 42 | 1.25 | 15 | 4.5 | 9.5 |
| 43 | 1.25 | 25 | 5.5 | 9.5 |
| 44 | 1.25 | 35 | 5.5 | 10 |
| C24 | 2.0 | 0 | 5 | 10 |
| 45 | 2.0 | 5 | 5.5 | 10 |
| 46 | 2.0 | 15 | 6 | 10 |
| 47 | 2.0 | 25 | 6 | 10 |
| 48 | 2.0 | 35 | 6 | 10 |

The data in TABLE 5 show that, upon addition of PB 0400 polybutylene, oil and/or water repellencies were improved at all levels of fluorochemical oxazolidinone. The effects were most dramatic at lower concentrations for both additives.

Examples 49–59 and Comparative Examples C25–C28

In Examples 49–57 and Comparative Examples C25–C27, the surface modifying additive employed was a fluorochemical ester repellent "A" ("FC Ester") prepared as follows. A 500 mL 2-necked round-bottom flask equipped with overhead condenser, thermometer and Dean-Stark trap wrapped with heat tape was charged with 57.8 g (0.190 eq) of EMPOL™ 1008 dimer acid (a distilled and hydrogenated dimer acid based on oleic acid having an acid equivalent weight of 305, available from Henkel Corm./Emery Group, Cincinnati Ohio), 100 g (0.185 eq) of MeFOSE ($C_8F_{17}SO_2N$ $(CH_3)CH_2CH_2OH$, having an equivalent weight of 540, can be prepared using the procedure described in Example 1 of U.S. Pat. No. 2,803,656), 1 g of p-toluenesulfonic acid and 50 g of toluene. The resulting mixture was placed in an oil bath heated to 150° C. The degree of esterification was monitored by measuring the amount of water collected in the Dean-Stark trap and also by using gas chromatography to determine the amount of unreacted fluorochemical alcohol. After 18 hours of reaction, about 2.8 mL of water was collected and a negligible amount of fluorochemical alcohol remained, indicating a complete reaction. The reaction mixture was then cooled to 100° C. and was twice washed with 120 g aliquots of deionized water to a water pH of 3. The final wash was removed from the flask by suction, and the reaction mixture was heated to 120° C. at an absolute pressure of about 90 torr to remove volatiles. The product, a brownish solid, was characterized as containing the desired product by $^1H$ and $^{13}C$ NMR spectroscopy and thermogravimetric analysis. Fluorochemical ester "A" was mixed with PP 3505G polypropylene at 1.0, 1.25 and 1.5 wt. % along with PB 0400 polybutylene ("PB") at 0, 5, 10 and 15 wt. %, and nonwoven webs were extruded as described in the Melt-Blown Extrusion Procedure.

In Examples 58–59 and Comparative Example C28, the surface modifying additive employed was fluorochemical ester repellent "B" ("FC Ester"), prepared using essentially the same procedure as with fluorochemical repellent "A" except that an equimolar quantity of dodecanoic acid ($HOOC(CH_2)_{10}COOH$, commercially available from E. I. DuPont de Nemours, Wilmington, Del.) was substituted for the EMPOL™ 1008 dimer acid. Fluorochemical ester "B" was mixed with PP 3505G polypropylene at 1.0 wt. % along with PB 0400 polybutylene ("PB") at 0, 5 and 10 wt. %, and nonwoven webs were extruded as described in the Melt-Blown Extrusion Procedure.

Oil and water repellencies for each web are presented in TABLE 6.

TABLE 6

| Ex. # | FC Ester | Wt. % FC Ester | Wt. % PB | OR | WR |
|---|---|---|---|---|---|
| C25 | A | 1.0 | 0 | 0 | 7 |
| 49 | A | 1.0 | 5 | 2 | 7 |
| 50 | A | 1.0 | 10 | 1 | 8 |
| 51 | A | 1.0 | 15 | 1 | 8 |
| C26 | A | 1.25 | 0 | 1 | 8 |
| 52 | A | 1.25 | 5 | 1 | 8 |
| 53 | A | 1.25 | 10 | 1 | 8 |
| 54 | A | 1.25 | 15 | 1 | 8 |
| C27 | A | 1.5 | 0 | 2 | 8 |
| 55 | A | 1.5 | 5 | 1 | 8 |
| 56 | A | 1.5 | 10 | 1 | 8 |
| 57 | A | 1.5 | 15 | 1 | 8 |
| C28 | B | 1.0 | 0 | 0 | 4 |
| 58 | B | 1.0 | 5 | 1 | 7 |
| 59 | B | 1.0 | 10 | 1 | 6.5 |

Examples 60–71 and Comparative Examples C29–C32

Using the Melt-Blown Extrusion Procedure, webs were extruded from PP 3505G polypropylene containing the fluoroaliphatic group-containing non-ionic compound (hydrophilicity-imparting additive) $C_8F_{17}SO_2N(C_2H_5)(CH_2CH_2O)_7CH_3$ ("FC") at concentrations varying from 0.5 to 2.0 wt. % and PB 0400 polybutylene at concentrations varying from 0 to 10 wt. %. The resulting webs were evaluated for wetting by cold water and hot water using the Hydrophilicity Test. In this test, the lower the hydrophilicity value, the better the wetting of the web; a value of "1" is the best possible value.

The results of the testing are shown in TABLE 7.

TABLE 7

| Ex. # | Wt. % FC | Wt. % PB | Cold Water | Hot Water |
|---|---|---|---|---|
| C29 | 0.5 | 0 | 5 | 5 |
| 60 | 0.5 | 2.5 | 5 | 5 |
| 61 | 0.5 | 5 | 3.5 | 5 |
| 62 | 0.5 | 10 | 2.3 | 3 |
| C30 | 0.75 | 0 | 1.8 | 2 |
| 63 | 0.75 | 2.5 | 1 | 1 |
| 64 | 0.75 | 5 | 1 | 1 |
| 65 | 0.75 | 10 | 1 | 1 |
| C31 | 1.0 | 0 | 1 | 1 |
| 66 | 1.0 | 2.5 | 1 | 1 |
| 67 | 1.0 | 5 | 1 | 1 |
| 68 | 1.0 | 10 | 1 | 1 |
| C32 | 2.0 | 0 | 1 | 1 |
| 69 | 2.0 | 2.5 | 1 | 1 |
| 70 | 2.0 | 5 | 1 | 1 |
| 71 | 2.0 | 10 | 1 | 1 |

The data in TABLE 7 show that addition of PB 0400 polybutylene to polypropylene containing the lower concentrations of hydrophilic surface-modifying additive increased the hydrophilicity of the polypropylene to the level of hydrophilicity impartive by the higher concentrations of hydrophilic surface-modifying additive. The additional data set forth in TABLE 10 below show the beneficial effects of using polybutylene (at levels as low as 2.5 weight percent) with $C_8F_{17}SO_2N(C_2H_5)(CH_2CH_2O)_7CH_3$ at levels as high as 1.5 weight percent.

Examples 72–80 and Comparative Examples C33–C34

In Comparative Examples C33–C34, two hydrophilic surface-modifying additives, FC-A and FC-B (both mixtures of a fluoroaliphatic group-containing non-ionic compound and a hydrocarbon non-ionic surfactant, as described below), were each respectively dry-blended with PP 3505G polypropylene at 1 wt. % concentration, and nonwoven webs were extruded as described in the Melt-Blown Extrusion Procedure. The resulting webs were evaluated for wetting by cold water and hot water using the Hydrophilicity Test.

FC-A is a 50/50 wt. % mixture of (a) a condensation product (fluorochemical non-ionic surfactant) made by reacting the chloride of TRITON™ X-100 surfactant (octylphenoxypolyethoxyethanol, commercially available from Union Carbide Corp., South Charleston, W.Va.) with MeFOSA amide ($C_8F_{17}SO_2NH_2$) and (b) MAPEG™ 600DO (a dioleate of polyethylene glycol having a molecular weight of 600, a hydrocarbon non-ionic surfactant commercially available from BASF Corp., Mount Olive, N.J.). First, the chloride of TRITON™ X-100 surfactant was prepared as follows. To a 3-necked round bottom flask equipped with overhead stirrer, thermometer, reflux condenser and two attached gas washing bottles (the second bottle containing a 10% aqueous solution of sodium hydroxide) was charged 646 g (1.0 mol) of TRITON™ X-100 and 12.9 g of CELITE™ filtering medium (a silaceous filtering agent, approximately 95% silicon dioxide, commercially available from Aldrich Chemical Co., Milwaukee, Wis.). The resulting mixture was heated to 60° C., then 142.76 g (1.2 mol) of thionyl chloride was added via an addition funnel over a period of about 22 minutes, raising the reaction mixture temperature to 75° C. Then nitrogen was bubbled through the reaction mixture for 4 hours, during which time the mixture temperature varied from 68–71° C. The reflux condenser and gas washing bottles were replaced by a still head, and the reaction mixture was stirred while a vacuum of about 50 torr absolute pressure was applied. After the reaction was shown to be complete by $^{13}C$ and $^1H$ NMR analysis, the reaction mixture was filtered hot through a C-porosity fritted glass Buchner funnel to yield a light yellow product, the chloride of TRITON™ X-100. The resulting TRITON™ X-100 chloride was then reacted with MeFOSA using the following procedure. To a 3-necked round bottom flask equipped with overhead stirrer, reflux condenser and nitrogen inlet adapter was charged 125 g (0.244 eq) of MeFOSA (can be made as described by Brice et al. in U.S. Pat. No. 2,732,398), 177.80 g of TRITON™ X-100 chloride, 30.18 (0.2794 eq) of sodium carbonate and 2.46 g (0.0149 eq) of potassium iodide. The resulting reaction mixture was heated to 120° C. for 8 hours, at which time the MeFOSA had disappeared according to gas chromatographic (gc) analysis. After cooling to 95° C., the reaction mixture was washed with 157 g of 10% aqueous sulfuric acid followed by 157 g of deionized water. The washed reaction mixture was concentrated by evaporation on a rotary evaporator at 70° C. and 50 torr absolute pressure to give 252.6 g of a brown liquid (92.2% yield). The structure of the desired product was $C_8F_{17}SO_2N(CH_3)(C_2H_4O)_{9.5}$-p-$C_6H_4$—$C_8H_{17}$, as confirmed by $^{13}C$ and $^1H$ NMR spectroscopy.

FC-B is a 50/50 wt. % mixture of (a) the same TRITON™ X-100 chloride/MeFOSA amide condensation product as described for FC-A (i.e., $C_8F_{17}SO_2N(CH_3)(C_2H_4O)_{9.5}$-p-$C_6H_4$—$C_8H_{17}$) and (b) MAPEG™ 400 MOT (a monotallate of polyethylene glycol having a molecular weight of 400, a hydrocarbon non-onic surfactant commercially available from BASF Corp.).

In Example 72, the same experiment was run as in Comparative Example C33, and in Examples 75–78, the same experiments were run as in Comparative Example C34, except that varying concentrations of PB 0400 polybutylene, a second polymer ("MP"), were added to the polymer mixtures prior to extrusion.

In Examples 73 and 79, the same experiments were run as in Comparative Examples C33 and C34, respectively, except that 5 wt. % DP 8340 copolymer (a copolymer of 1-butylene and ethylene having a 4 melt flow index, available from Montell, Houston, Tex.), another second polymer, was added to each polymer mixture prior to extrusion.

In Examples 74 and 80, the same experiments were run as in Comparative Examples C33 and C34, respectively, except that 5 wt. % ENGAGE™ 8401 copolymer ("ENG 8401", an octene/ethylene copolymer containing 19% octene, available from DuPont Dow Elastomers LLC, Wilmington Del.), yet another second polymer, was added to each polymer mixture prior to extrusion.

The results of the testing are shown in TABLE 8.

TABLE 8

| Ex. # | FC | Wt. % FC | MP | Wt. % MP | Cold Water | Hot Water |
| --- | --- | --- | --- | --- | --- | --- |
| C33 | FC-A | 1 | — | 0 | 5 | 5 |
| 72 | FC-A | 1 | PB 0400 | 5 | 1 | 1 |
| 73 | FC-A | 1 | DP 8340 | 5 | 1.6 | 1.2 |
| 74 | FC-A | 1 | ENG 8401 | 5 | 3.6 | 3.2 |
| C34 | FC-B | 1 | — | 0 | 4.5 | 4.5 |
| 75 | FC-B | 1 | PB 0400 | 2.5 | 1.7 | 2.7 |
| 76 | FC-B | 1 | PB 0400 | 5 | 1.2 | 1 |
| 77 | FC-B | 1 | PB 0400 | 10 | 1 | 1 |
| 78 | FC-B | 1 | PB 0400 | 20 | 1 | 1 |
| 79 | FC-B | 1 | DP 8340 | 5 | 1.6 | 1.2 |
| 80 | FC-B | 1 | ENG 8401 | 5 | 3.2 | 3.2 |

The data in TABLE 8 show that addition of each second polymer to polypropylene containing FC-A or FC-B hydrophilic modifying additive improved the hydrophililicity of the web.

Examples 81–87

In Examples 81–87, fluoroaliphatic group-containing non-ionic compound (hydrophilic surface-modifying additive) FC-C was dry-blended with PP 3505G polypropylene at 1 wt. % concentration along with varying percentages of EXXON™ 4038 copolymer, a second polymer ("MP") which is an ethylene/butylene copolymer of 125 melt flow index having 21% by weight butene. Using the Melt-Blown Extrusion Procedure, nonwoven webs were extruded from the resulting polymer mixtures. The resulting webs were evaluated for wetting by cold water using the Hydrophilicity Test.

FC-C, the fluorochemical surfactant reaction product of MeFOSA and GENAPOL™ 26-L-80 chloride having the structure $C_8F_{17}SO_2N(CH_3)(C_2H_4O)_{9.5}C_{12-16}H_{25-33}$, was prepared essentially as described for Fluoroaliphatic Group-containing Nonionic Compound F-21 in U.S. Pat. No. 5,804,625 at col. 12–13, which description is incorporated herein by reference. GENAPOL™ 26-L-80 is nominally $C_{12-16}H_{25-33}(OCH_2)_{9.5}OH$, commercially available from Hoechst Celanese Corp., Charlotte, N.C.

The results of the evaluations are shown in TABLE 9.

TABLE 9

| Ex. # | Wt. % FC-C | MP Wt. % 4038 | Cold Water |
| --- | --- | --- | --- |
| 81 | 1 | 1 | 5 |
| 82 | 1 | 2 | 4.5 |
| 83 | 1 | 3 | 4 |
| 84 | 1 | 5 | 3 |
| 85 | 1 | 7.5 | 2.5 |
| 86 | 1 | 10 | 2 |
| 87 | 1 | 12 | 1 |

The data in TABLE 9 show that hydrophilicity value continually decreased (i.e., the web continually became more hydrophilic) as increasing amounts of EXXON™ 4038 ethylene/elbutylene copolymer were added to the polymer mix.

Examples 88–111 and Comparative Examples C35–C42

To investigate the effect of polybutylene addition on wetting time, a set of experiments was carried out using sorbents made of meltblown webs extruded from polypropylene containing various amounts of hydrophilic surface-modifying additive and polybutylene. Wetting times were measured using polar liquids representing a variety commmonly occurring spills, such as aqueous caustic, concentrated sulfuric acid, and ethylene glycol (the active component of antifreeze).

In examples 88–99 and Comparative Examples C35–C37, fluoroaliphatic group-containing non-ionic compound (hydrophilic surface-modifying additive) FC-B was dry-blended with PP 3505G polypropylene at 1, 2 and 3 wt. % concentrations along with PB 0400 polybutylene at 0, 2.5, 5, 10 and 20 wt. % concentrations. Nonwoven webs were Procedure. The resulting webs were evaluated for wetting times (in seconds) using the Polar Solvent Wetting Time Test.

In Examples 100–111 and Comparative Examples C3 8–C4 1, the same extrusion and evaluation procedure was followed as described in Examples 88–99 and Comparative Examples C35–C37, respectively, except that $C_8F_{17}SO_2N(C_2H_5)(CH_2CH_2O)_7CH_3$(FC-D) was substituted for FC-B as the fluoraliphatic group-containing non-ionic compound and was evaluated at 0.5, 0.75, 1.0 and 1.5 wt. % concentrations with and without PB 0400 polybutylene at 0, 2.5, 5 and 10 wt. % concentrations.

In Comparative Example C42, neither a surface-modifying additive nor a second polymer was incorporated in the polypropylene prior to extrusion and evaluation.

Test results are presented in TABLE 10.

TABLE 10

| Ex. # | FC name | wt. % FC | wt. % PB 0400 | DI H₂O | 10% NaOH | 20% NaOH | 30% NaOH | neat EG | conc. H₂SO₄ |
|---|---|---|---|---|---|---|---|---|---|
| C35 | FC-B | 1 | 0 | NW | NW | NW | NW | 6,NW* | NW |
| 88 | FC-B | 1 | 2.5 | 3,10* | 8,NW* | NW | NW | 1 | NW |
| 89 | FC-B | 1 | 5 | 1 | 3 | NW | NW | 1 | NW |
| 90 | FC-B | 1 | 10 | 0 | 1 | NW | 60 | 1 | 1 |
| 91 | FC-B | 1 | 20 | 0 | 1 | 20 | 6 | 0 | 0 |
| C36 | FC-B | 2 | 0 | 0 | 3 | NW | 90 | 0 | 0 |
| 92 | FC-B | 2 | 2.5 | 0 | 1 | NW | 10 | 0 | 0 |
| 93 | FC-B | 2 | 5 | 0 | 0 | NW | 6 | 0 | 0 |
| 94 | FC-B | 2 | 10 | 0 | 1 | 10 | 5 | 0 | 0 |
| 95 | FC-B | 2 | 20 | 0 | 0 | 6 | 1 | 0 | 0 |
| C37 | FC-B | 3 | 0 | 0 | 1 | NW | 6 | 0 | 0 |
| 96 | FC-B | 3 | 2.5 | 0 | 1 | NW | 15 | 0 | 0 |
| 97 | FC-B | 3 | 5 | 0 | 1 | 20 | 6 | 0 | 0 |
| 98 | FC-B | 3 | 10 | 0 | 1 | 20 | 5 | 0 | 0 |
| 99 | FC-B | 3 | 20 | 0 | 0 | 10 | 3 | 0 | 0 |
| C38 | FC-D | 0.5 | 0 | NW | NW | NW | NW | NW | NW |
| 100 | FC-D | 0.5 | 2.5 | NW | NW | NW | NW | NW | NW |
| 101 | FC-D | 0.5 | 5 | NW | NW | NW | NW | 10 | NW |
| 102 | FC-D | 0.5 | 10 | NW | NW | NW | NW | 6 | NW |
| C39 | FC-D | 0.75 | 0 | NW | NW | NW | NW | 1 | NW |
| 103 | FC-D | 0.75 | 2.5 | 0 | 0 | NW | 4 | 0 | 1 |
| 104 | FC-D | 0.75 | 5 | 0 | 0 | NW | NW | 1 | 1 |
| 105 | FC-D | 0.75 | 10 | 0 | 0 | NW | 6 | 0 | 1 |
| C40 | FC-D | 1.0 | 0 | 0,NW⁺ | 0,NW⁺ | NW | NW | 0 | 6,NW⁺ |
| 106 | FC-D | 1.0 | 2.5 | 1 | 0 | NW | NW | 0 | 0 |
| 107 | FC-D | 1.0 | 5 | 0 | 0 | NW | NW | 0 | NW |
| 108 | FC-D | 1.0 | 10 | 0 | 0 | NW | 6 | 0 | 0 |
| C41 | FC-D | 1.5 | 0 | 0 | NW | NW | NW | 30 | 0 |
| 109 | FC-D | 1.5 | 2.5 | 0 | 0 | NW | 4 | 0 | 0 |
| 110 | FC-D | 1.5 | 5 | 0 | 0 | NW | 4 | 0 | 0 |
| 111 | FC-D | 1.5 | 10 | 0 | 0 | NW | 3 | 0 | 0 |
| C42 | — | 0 | 0 | NW | NW | NW | NW | NW | NW |

*Values from edge and center measurements on the web sample, respectively
⁺Values from left edge and right edge/center on the web sample, respectively The data in TABLE 10 show that the addition of PB 0400 polybutylene to PP 3505G polypropylene containing either hydrophilicity-imparting additive generally decreased the wetting time of the web.

Various modifications and alternations of this invention will become apparent to those skilled in the art without departing from the scope or spirit of this invention.

What is claimed is:

1. A thermoplastic composition comprising (a) a major amount of at least one semi-crystalline thermoplastic first polymer, said first polymer being polypropylene; (b) an amount of at least one fluoroaliphatic radical-containing surface-modifying additive sufficient to modify surface properties of articles made of said composition; and (c) a minor amount of at least one second thermoplastic polymer sufficient to increase said modification of surface properties compared to such composition without said second polymer, said second polymer being selected from the group consisting of polybutylene and copolymers of butylene and ethylene; wherein said additive is present in an amount of 0.1 to 2.0 weight percent and said second polymer is present in an amount of 5 to 25 weight percent, said weight percentages being based upon the total weight of all components.

2. The composition of claim 1 wherein said second polymer is polybutylene.

3. The composition of claim 1 wherein said second polymer is a copolymer of butylene and ethylene.

4. The composition of claim 1 wherein said second polymer is present in an amount of 5 to 20 weight percent.

5. The composition of claim 1 wherein said additive is present in an amount of 0.1 to 1.0 weight percent.

6. The composition of claim 1 wherein said additive can be melt-processed with said first and second polymers and still impart desired properties to surfaces of articles made of said composition.

7. The composition of claim 1 wherein said additive comprises a fluoroaliphatic radical of at least 3 fully-fluorinated carbon atoms.

8. The composition of claim 7 wherein said fluoroaliphatic radical comprises from 3 to 25 fully-fluorinated carbon atoms.

9. The composition of claim 1 wherein said additive is selected from the group consisting of fluorochemical oxazolidinones and hydrophilic fluoroaliphatic group-containing non-ionic compounds.

10. The composition of claim 9 wherein said additive is a fluorochemical oxazolidinone.

11. The composition of claim 9 wherein said additive is a hydrophilic fluoroaliphatic group-containing non-ionic compound.

12. The composition of claim 11 wherein said hydrophilic fluoroaliphatic group-containing non-ionic compound is a fluoroaliphatic radical-containing polyoxyalkylene.

13. The composition of claim 1 wherein said additive is a mixture of at least one hydrophilic fluoroaliphatic group-containing non-ionic compound and at least one hydrocarbon non-ionic surfactant.

14. A thermoplastic composition comprising (a) a major amount of at least one semi-crystalline thermoplastic first polymer, said first polymer being polypropylene; (b) an amount of at least one fluoroaliphatic radical-containing surface-modifying additive sufficient to modify surface properties of articles made of said composition, said additive being a fluorochemical oxazolidinone or a fluorochemical ester; and (c) a minor amount of at least one second thermoplastic polymer sufficient to increase said modification of surface properties compared to such composition without said second polymer, said second polymer being selected from the group consisting of polybutylene and copolymers of butylene and ethylene; wherein said additive is present in an amount of 0.1 to 1.0 weight percent and said second polymer is present in an amount of 5 to 20 weight percent, said weight percentages being based upon the total weight of all components.

15. A thermoplastic composition comprising (a) a major amount of at least one semi-crystalline thermoplastic first polymer, said first polymer being polypropylene; (b) an amount of at least one fluoroaliphatic radical-containing surface-modifying additive sufficient to modify surface properties of articles made of said composition, said additive being a hydrophilic fluoroaliphatic group-containing non-ionic compound; and (c) a minor amount of at least one second thermoplastic polymer sufficient to increase said modification of surface properties compared to such composition without said second polymer, said second polymer being selected from the group consisting of polybutylene and copolymers of butylene and ethylene; wherein said additive is present in an amount of 0.1 to 1.5 weight percent and said second polymer is present in an amount of 2.5 to 20 weight percent, said weight percentages being based upon the total weight of all components.

16. A thermoplastic composition comprising (a) a major amount of at least one semi-crystalline thermoplastic first polymer, said first polymer being polypropylene; (b) an amount of at least one fluoroaliphatic radical-containing surface-modifying additive sufficient to modify surface properties of articles made of said composition, said additive being a mixture of at least one hydrophilic fluoroaliphatic group-containing non-ionic compound and at least one hydrocarbon non-ionic surfactant, and (c) a minor amount of at least one second thermoplastic polymer sufficient to increase said modification of surface properties compared to such composition without said second polymer, said second polymer being selected from the group consisting of polybutylene and copolymers of butylene and ethylene; wherein said additive is present in an amount of 0.1 to 3.0 weight percent and said second polymer is present in an amount of 2.5 to 20 weight percent, said weight percentages being based upon the total weight of all components.

17. A shaped article comprising the composition of claim 1.

18. The shaped article of claim 17 wherein said shaped article is a fiber.

19. The shaped article of claim 17 wherein said shaped article is a film.

20. A fabric comprising the fiber of claim 18.

21. A respirator comprising the fabric of claim 20.

22. A method for improving the surface-modifying effect of a fluoroaliphatic radical-containing surface-modifying additive, which comprises the steps of (a) preparing a thermoplastic composition comprising (i) a major amount of at least one semicrystalline thermoplastic first polymer, said first polymer being polypropylene, (ii) an amount of at least one fluoroaliphatic radical-containing surface-modifying additive sufficient to modify surface properties of articles made of said composition, and (iii) a minor amount of at least one second thermoplastic polymer sufficient to increase said modification of surface properties compared to such composition without said second polymer, said second polymer being selected from the group consisting of polybutylene and copolymers of butylene and ethylene, and wherein said additive is present in an amount of 0.1 to 2.0 weight percent and said second polymer is present in an amount of 5 to 25 weight percent, said weight percentages being based upon the total weight of all components; and (b) melt-processing said composition.

* * * * *

UNITED STATES PATENT AND TRADEMARK OFFICE
CERTIFICATE OF CORRECTION

PATENT NO.      : 6,380,289 B1
DATED           : April 30, 2002
INVENTOR(S)     : Delton R. Thompson, Jr.

It is certified that error appears in the above-identified patent and that said Letters Patent is hereby corrected as shown below:

Column 2,
Line 51, delete "hydrophllicity" and insert in place thereof -- hydrophilicity --.

Column 3,
Line 18, after "thereof" add -- . --.

Column 7,
Line 23, delete "detennmined" and insert in place thereof -- determined --.

Column 8,
Line 10, delete "witout" and insert in place thereof -- without --.

Column 9,
Line 25, delete "fluoraliphatic" and insert in place thereof -- fluoroaliphatic --.
Line 34, delete "surface-g" and insert in place thereof -- surface-modifying --.
Line 58, delete "hydrophililic" and insert in place thereof -- hydrophilic --.

Column 11,
Line 37, delete "propylene" and insert in place thereof -- polypropylene --.

Column 12,
Line 36, delete "Corm./Emery" and insert in place thereof -- Corp./Emery --.

Column 13,
Line 65, delete "impartive" and insert in place thereof -- imparted --.

Column 15,
Line 4, delete "non-onic" and insert in place thereof -- non-ionic --.
Line 44, delete "hydrophililicity" and insert in place thereof -- hydrophilicity --.

Column 16,
Line 1, delete "$C_{12-16}H_{25-33}(OCH_2)_{9.5}OH$" and insert in place thereof
-- $C_{12-16}H_{25-33}(OCH_2CH_2)_{9.5}OH$ --.
Line 22, delete "ethylene/elbutylene" and insert in place thereof -- ethylene/butylene --.
Lines 36-37, delete "commmonly" and insert in place thereof -- commonly --.
Lines 47-48, between "were" and "Procedure." add -- extruded using the Melt-Blown Extrusion --.

UNITED STATES PATENT AND TRADEMARK OFFICE
CERTIFICATE OF CORRECTION

PATENT NO.    : 6,380,289 B1
DATED         : April 30, 2002
INVENTOR(S)   : Delton R. Thompson, Jr.

It is certified that error appears in the above-identified patent and that said Letters Patent is hereby corrected as shown below:

Column 16 (cont'd),
Lines 52-53, delete "C38-C4 1" and insert in place thereof -- C38-C41 --.
Line 57, delete "fluoraliphatic" and insert in place thereof -- fluoroaliphatic --.

Signed and Sealed this

Twenty-first Day of October, 2003

JAMES E. ROGAN
*Director of the United States Patent and Trademark Office*